US009552836B2

(12) United States Patent
Ramakrishnan et al.

(10) Patent No.: US 9,552,836 B2
(45) Date of Patent: Jan. 24, 2017

(54) SLIDER INCLUDING ONE OR MORE FLUID PATHWAYS, AND RELATED APPARATUSES AND METHODS

(71) Applicant: Seagate Technology LLC, Cupertino, CA (US)

(72) Inventors: Narayanan Ramakrishnan, Eden Prairie, MN (US); Ajaykumar Rajasekharan, Bloomington, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/139,438

(22) Filed: Dec. 23, 2013

(65) Prior Publication Data
US 2015/0179200 A1 Jun. 25, 2015

(51) Int. Cl.
G11B 5/60 (2006.01)
G11B 5/10 (2006.01)
G11B 5/31 (2006.01)

(52) U.S. Cl.
CPC ............ G11B 5/6082 (2013.01); G11B 5/10 (2013.01); G11B 5/6005 (2013.01); G11B 5/3106 (2013.01)

(58) Field of Classification Search
CPC ..... G11B 5/6005; G11B 21/21; G11B 5/6082; G11B 5/40; G11B 5/3106; G11B 5/10
USPC ................. 360/235.5, 235.7, 236.5
See application file for complete search history.

(56) References Cited

U.S. PATENT DOCUMENTS

| 5,200,868 | A | | 4/1993 | Chapin et al. | |
|---|---|---|---|---|---|
| 5,386,400 | A | * | 1/1995 | Nakayama et al. | 369/13.17 |
| 5,751,517 | A | * | 5/1998 | Agarwal | 360/235.4 |
| 5,768,056 | A | * | 6/1998 | Boutaghou et al. | 360/235.1 |
| 6,055,127 | A | * | 4/2000 | Boutaghou et al. | 360/236 |
| 6,188,547 | B1 | * | 2/2001 | Gui et al. | 360/236.5 |
| 6,233,118 | B1 | * | 5/2001 | Boutaghou et al. | 360/235.4 |
| 6,421,202 | B1 | * | 7/2002 | Tanaka et al. | 360/122 |
| 6,424,493 | B1 | * | 7/2002 | Matsumoto et al. | 360/235.5 |
| 6,445,543 | B1 | * | 9/2002 | Gui et al. | 360/236.6 |
| 6,504,682 | B1 | * | 1/2003 | Sannino et al. | 360/235.8 |
| 6,594,113 | B2 | * | 7/2003 | Rao et al. | 360/235.8 |
| 6,747,847 | B2 | * | 6/2004 | Stoebe et al. | 360/235.8 |
| 7,054,108 | B2 | * | 5/2006 | Boutaghou et al. | 360/236.5 |
| 7,227,723 | B2 | * | 6/2007 | Nath et al. | 360/235.7 |
| 7,333,297 | B2 | * | 2/2008 | Park | 360/235.5 |
| 7,502,202 | B2 | * | 3/2009 | Takahashi | 360/236.3 |
| 7,855,854 | B2 | * | 12/2010 | Hu et al. | 360/235.7 |
| 7,961,433 | B2 | * | 6/2011 | Zheng et al. | 360/236.5 |
| 8,164,859 | B2 | * | 4/2012 | Imamura et al. | 360/235.1 |

(Continued)

OTHER PUBLICATIONS

Ambekar, R.P. et al. "Lubricant Depletion and Disk-to Head Lubricant Transfer at the Head-Disk Interface in Hard Disk Drives", Journal of Tribology, 131: (2009) pp. 031901-1-031901-8.

(Continued)

Primary Examiner — Brian Miller
(74) Attorney, Agent, or Firm — Kagan Binder, PLLC

(57) ABSTRACT

The present invention is directed to a slider that includes at least one fluid pathway that is in fluid communication with an air bearing face and/or the trailing edge face of the slider. The at least one fluid pathway is configured to propel/transport a fluid such as a lubricant toward at least one side face via capillary action. The present invention is also directed to related apparatuses and methods.

19 Claims, 6 Drawing Sheets

(56) References Cited

U.S. PATENT DOCUMENTS

| | | | |
|---|---|---|---|
| 8,169,744 | B2 | 5/2012 | Dorius |
| 8,174,794 | B2* | 5/2012 | Dorius .................. 360/235.1 |
| 8,199,435 | B2* | 6/2012 | Fong et al. ............. 360/234.4 |
| 8,203,805 | B2* | 6/2012 | Huang et al. ........... 360/235.4 |
| 8,520,339 | B2 | 8/2013 | Sonda et al. |
| 8,593,763 | B2* | 11/2013 | Scheppers et al. ........ 360/235.7 |
| 8,810,968 | B2* | 8/2014 | Rajasekharan et al. ... 360/235.7 |
| 2002/0001157 | A1 | 1/2002 | Kang et al. |
| 2003/0058578 | A1 | 3/2003 | Boutaghou et al. |
| 2005/0207065 | A1 | 9/2005 | Takagi |
| 2008/0123220 | A1* | 5/2008 | Kajitani ................ 360/236.3 |
| 2008/0158716 | A1* | 7/2008 | Kubotera et al. ........... 360/75 |
| 2009/0059432 | A1* | 3/2009 | Kubotera et al. ........ 360/236.6 |
| 2009/0219651 | A1 | 9/2009 | Zheng et al. |
| 2010/0103560 | A1* | 4/2010 | Imamura et al. ......... 360/234.3 |
| 2010/0202085 | A1* | 8/2010 | Ishii et al. .................. 360/110 |
| 2010/0238592 | A1* | 9/2010 | Mizutani ............. G11B 5/6005 360/235.4 |
| 2012/0275051 | A1* | 11/2012 | Scheppers ........... G11B 5/6005 360/96.61 |

OTHER PUBLICATIONS

Dai, Q. et al. "Modeling the washboard effect at the head/disk interface", Journal of Applied Physics, 96(1): (2004) pp. 696-703.

Goto Y. et al. "Head Disk Interface Technologies for High Recording Density and Reliability", Fujitsu Sci. Tech. J. 42(1): (2006) pp. 113-121.

Gui, Jing. "Tribology Challenges for Head-Disk Interface Toward 1 Tb/in$^2$", IEEE Transaction on Magnetics, 39(2): (2003) pp. 716-721.

Katta, R.R. et al. "Experimental and FEA Scratch of Magnetic Storage Thin-Film Disks to Correlate Magnetic Signal Degradation With Permanent Deformation", Journal of Tribology, 132: (2010) pp. 021902-1-021902-11.

Kubotera, H. et al. "Lubricant Migration Simulations on the Flying Head Slider Air-Bearing Surface in a Hard Disk Drive", IEEE Transaction on Magnetics, 43(9): (2007) pp. 3710-3715.

Marchon, B. et al. "A Model for Lubricant Flow From Disk to Slider", IEEE Transaction on Magnetics, 39(5): (2003) pp. 2447-2449.

Marchon, B. et al. "The Physics of Disk Lubricant in the Continuum Picure", IEEE Transaction on Magnetics, 41(2): (2005) pp. 616-620.

Pit, R. et al. "Formation of lubricant "moguls" at the head/disk interface", Tribology Letters, 10(3): (2001) pp. 133-142.

Yoon, S.J. et al. "Design Sensitivity Analysis of Air-Lubricated Slider Bearings", IEEE Transaction on Magnetics, 38(5): (2002) pp. 2171-2173.

\* cited by examiner

SLIDER INCLUDING ONE OR MORE FLUID PATHWAYS, AND RELATED APPARATUSES AND METHODS

BACKGROUND

Magnetic data storage devices generally include magnetic recording heads, commonly referred to as transducing heads, which can detect and modify the magnetic properties of a magnetic storage medium to store data.

Air-bearing sliders can be used in magnetic data storage devices to appropriately position a transducing head above a rotating magnetic disc. During operation, the disc typically rotates at high speeds, which can generate a stream of air flow immediately adjacent to the flat surface of the disc. This stream of air acts upon a lower air-bearing surface of the air-bearing face of the slider and can generate a force directing the slider away from the disc and against a load beam causing the slider to "fly" a small distance above the disc.

A prior art magnetic recording apparatus is shown in FIG. 1. The apparatus 10 is commonly referred to as a hard disc drive (HDD) and includes a slider 14 that flies above a disc 11 by using air as a lubricant. Referring to FIG. 1, a disc 11 is placed on a spindle motor 12 that can rotate and a negative pressure air-lubricated bearing slider 14 is attached at a suspension 15 to correspond to the magnetic disc 11. The negative pressure air-lubricated bearing slider 14 can be moved (as indicated by the arrow and dashed lines) by an actuator 16 which pivots so that the slider 14 moves to a desired position on a track 13 of the disc 11. As shown, the disc 11 used as a recording medium has a circular shape and different information can be recorded on each track 13. In general, to obtain desired information, the slider 14 moves in search of a corresponding track on the disc 11. Disc 11 can have a magnetic layer that is susceptible to physical and/or chemical damage. To help mitigate such damage, such a disc often has a coating such as Diamond-like Carbon (DLC) as an overcoat to help protect the magnetic layer from physically and/or chemically induced damage. Discs such as disc 11 often have one or more lubricants on the top surface thereof to help reduce friction and corrosion.

FIG. 2 shows a schematic diagram of prior art air-bearing slider body 120 of a magnetic recording head, which includes air-bearing face 122 defined by leading edge 120a, trailing edge 120b, and two side edges 120c connecting the leading and trailing edges. Air-bearing slider 120 also includes transducing head 124. As shown in FIG. 2, transducing head 124 is arranged toward trailing edge 120b of slider body 120. Air-bearing face 122 can be designed to control the aerodynamic performance of slider body 120 as it flies over a rotating magnetic disc. As shown, air-bearing face 122 includes structural features such as rails, lands, ramps, depressions and the like that are typically designed to maximize the pressure on air-bearing surfaces of the air-bearing face created by the stream of air flowing between face 122 and the disc near transducer 124. Causing pressure at transducer 124 to be relatively high can help increase the stiffness of the suspension assembly (not shown) of the magnetic recording head at transducer 124. Increasing the stiffness can cause the suspension assembly, e.g. an actuator arm, and thereby the recording head, to be less subject to system vibration during operation, which in turn can minimize fly height sensitivity to manufacturing variation, environmental factors, and disk roughness.

As magnetic disc storage systems are designed for greater and greater storage capacities, the aerial density of magnetic discs is generally increasing such that the air-bearing gap between the transducer carried by the slider and the rotating magnetic disc is oftentimes reduced, which in turn can result in operating the air-bearing slider at ultra-low fly heights.

Unfortunately, a reduction in flying height can result in a variety of undue interactions between the slider (especially the trailing edge of the slider) and disc. For example, lubricant that is typically provided on a disc may result in interference among a slider and the lubricant on the disc to an undue degree. One problem with lubricant and undue interactions among a slider and a disc is described with respect to FIGS. 3 and 4. As shown in FIGS. 3 and 4, a slider body 230 includes an air bearing face 215 having a leading edge 225 and a trailing edge 250. Slider body 230 also includes a first side face 235, a second side face (not shown), and trailing edge face 270. During operation, lubricant 220 (which sometimes includes contaminants) can be transferred to slider body 230 from disc 210 during operation of a disc drive and form droplets 225 on air bearing face 215. After lubricant 220 transfers to air bearing face 215, it tends to migrate on the air bearing face 215 due to, e.g., underlying shear and pressure gradient forces represented by streamlines 240. The droplets 225 of lubrication tend to migrate toward the trailing edge 250 of the slider 230. Near trailing edge 250, the lubrication tends to accumulate and form larger droplets 226 of lubrication. This may result in undesirable changes to the mean targeted head-media clearance and thereby affect drive performance to an undue degree. Additionally, droplets 226 can stick on to the slider body 230 near trailing edge 250 and grow in size until they eventually drop off under the action of some triggering force (such as during a shock event). The droplets of lubrication that are transferred back to disc 210 can interact with the slider 230 under certain circumstances to an undue degree (e.g., reduce head-disc clearance, cause large head-media spacing variation, and the like). Such interaction can in turn result in an excitation of the slider that may cause weak writes and/or read-write errors.

Accordingly, there is a need to manage lubricant that has transferred from a disc onto a slider body.

SUMMARY

The present invention helps mitigate and/or prevent undue interactions between the slider and a disc due to lubricant accumulating on the slider and/or due to lubricant accumulating on and dripping from slider onto the disc below the slider.

The present invention involves including one or more fluid pathways in fluid communication with the air bearing face and/or the trailing edge face of a slider, where the fluid pathway(s) are configured to collect lubricant that accumulates on the slider. The one or more channels are also configured to propel/transport the lubricant towards at least one side face of the slider via capillary action. By transporting the lubricant toward a side face, the lubricant can be transferred away from the transducer and toward relatively "low-impact" locations of the slider. Advantageously, fluid pathways configured for capillary action according to the present invention can be made using existing slider manufacturing techniques. Further, such fluid pathways can operate in a passive manner such that a slider according to the present invention can otherwise be used like many known sliders.

According to one aspect of the present invention, a slider body includes: an air bearing face; at least one side face; a trailing edge face that is adjacent to the trailing edge of the air bearing face; and at least one fluid pathway in fluid communication with the air bearing face and/or the trailing edge face. The air bearing face includes a leading edge and a trailing edge. The at least one fluid pathway can transport a fluid towards the at least one side face via capillary action.

According to another aspect of the present invention, a slider body includes: an air bearing face; a first side face; a second side face; a trailing edge face that is adjacent to the trailing edge of the air bearing face; and at least one channel in fluid communication with the air bearing face and/or the trailing edge face. The air bearing face comprises a leading edge and a trailing edge. The at least one channel is configured to transport a fluid towards the first side face and the second side face via capillary action. The fluid includes a lubricant.

DETAILED DESCRIPTION

Figure 1:
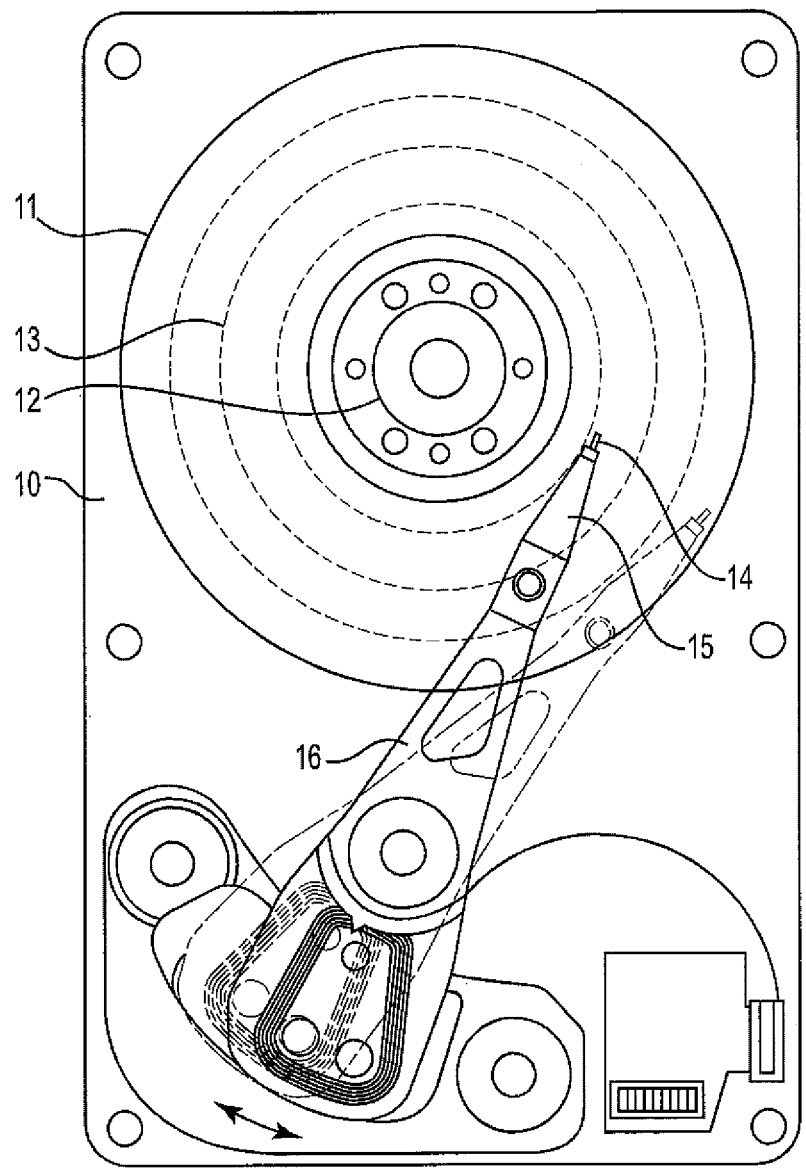
FIG. 1 shows a top view of a prior art hard disc drive.
Figure 2:
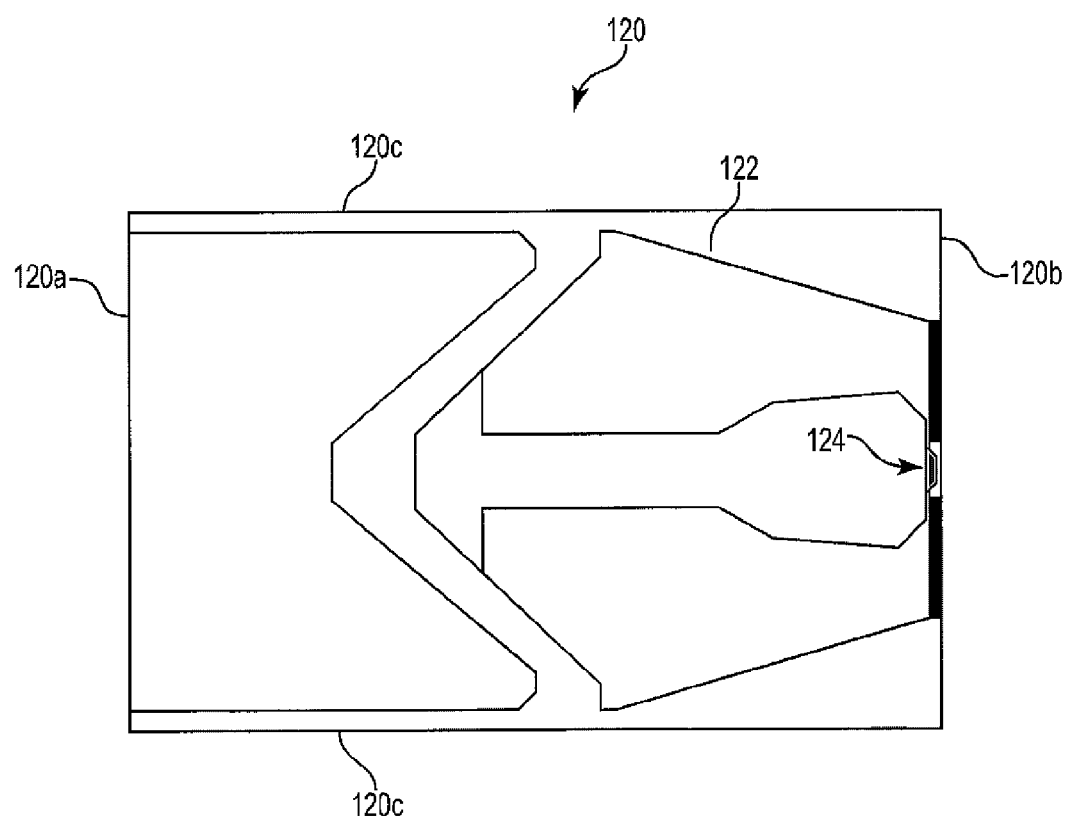
FIG. 2 shows a bottom view of a prior art slider body.

The present invention relates to a slider body, related apparatuses and systems that include such a slider body, and related methods. As discussed above with respect to FIG. 2, a slider body generally includes an air bearing face having a leading edge and a trailing edge, at least one side face (typically a first side face and a second side face), and a trailing edge face that is adjacent to the trailing edge of the air bearing face.

A slider body according to the present invention includes at least one fluid pathway in fluid communication with the air bearing face and/or the trailing edge face; wherein the at least one fluid pathway can transport a fluid toward the at least one side face via capillary action. Fluid movement due to capillary action is well known and involves the ability of a fluid such as a liquid to spontaneously flow in any direction. Fluid flow due to capillary action is due at least in part to intermolecular forces among the fluid (e.g., liquid) and one or more solid surfaces proximal to the fluid.

A fluid pathway as described herein can transport one or more liquids via capillary action. In one embodiment, a liquid can include one or more lubricants (e.g., a mixture of one or more lubricants) that are provided on the surface of hard discs for use during reading and writing processes. In some embodiments, a lubricant includes organic contaminants.

Figures 3, 4:
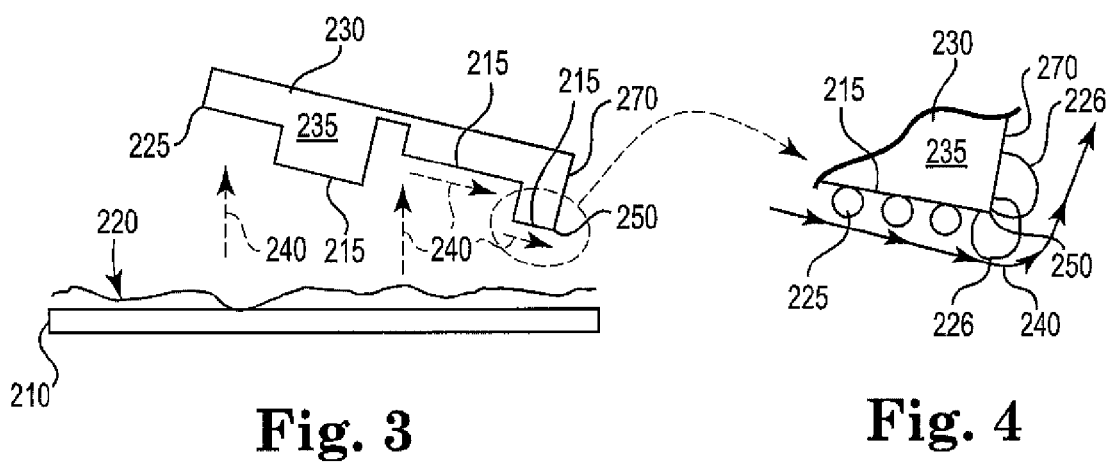
FIGS. 3 and 4 shows a cross-sectional view of a slider body in operation and accumulating lubricant near the trailing edge of the slider body.

Lubricants are oftentimes provided as a layer, e.g., molecularly thin layer, on the disc to help protect the disc (e.g., the Diamond-like Carbon (DLC) disc overcoat) from corrosion and reduce friction (e.g., so as to minimize wear). Exemplary lubricants can provide hydrophobic and oleophobic coating to a DLC overcoat so that the disc has an inert surface for a slider to fly on. Such lubricants are well known and include, for example, perfluoropolyethers such as perfluoropolyalkylether (PFPE). PFPE lubricant can have a bonded portion, which can bind itself to a disc surface, and a mobile (not bonded) portion. The bonded portion can provide a permanent coating on the DLC layer to reduce friction and corrosion and help the long-term reliability of the magnetic recording media part of the disc. The mobile portion of the lubricant can help replenish lubricant in regions or sites where lubricant depletion may occur. However, the mobile fraction of lubricant can also be responsible for disk-to-head lubricant transfer as discussed above with respect to FIGS. 3 and 4, which in turn can cause lubricant depletion on this disc as well as contamination of the air-bearing face and other parts of the slider which can result in unstable flying with respect to the air-bearing.

Lubricants such as PFPE are commercially available under the tradename Fomblin® Z PFPE, and its difunctional derivatives such as Fomblin® Z-DOL, Fomblin® Z-TETROL, and Fomblin® AM, from Solvay.

As discussed in detail herein below, at least one fluid pathway can be configured in a variety of ways to transport fluid toward at least one side face via capillary action. For example, the fluid pathway can be configured as a tunnel within the slider body, as a channel that is open to a surface of the slider body such that the channel is in fluid communication with the surface of the slider body, combinations of these, and the like. In one embodiment, a fluid pathway that is included in a slider body to transport one or more fluids via capillary action is configured as one or more channels in fluid communication with the air bearing face and/or the trailing edge face.

A fluid pathway configured to transport a liquid due to capillary action can be characterized according to the following equation that defines capillary pressure of a pathway:

$$P_{capillary} = \frac{2\gamma\cos\phi}{r}, \qquad \text{(Equation 1)}$$

where "γ" is the interfacial tension between the liquid being transported the solid material of the pathway, "θ" is the contact angle of a drop of the liquid being transported on the surface of the pathway, and "r" is the effective radius of curvature of the pathway. The interfacial tension can be reported in units of force per unit length. The interfacial tension can be used interchangeably with "surface energy," which is reported in units of energy per unit area.

In general, the interfacial tension "γ" and contact angle "θ" are related and can be adjusted to manipulate the capillary pressure "$P_{capillary}$." Further, the effective radius of curvature "r" is generally considered independent from the interfacial tension "γ" and contact angle "θ" and, therefore, can be considered a separate parameter that can be adjusted to manipulate the capillary pressure "$P_{capillary}$."

Surface energy and interfacial tension can be quantified based on a measured contact angle using a goniometer.

The contact angle is well known to be the angle formed between the solid/liquid interface and the liquid/vapor interface with the vertex at the three-phase boundary where the liquid, solid, and gas intersect. The contact angle of a liquid can be measured from a drop of liquid on the surface of a solid. The contact angle of a liquid can be readily measured by known techniques such as those that use a goniometer. Goniometers are commercially available from, e.g., ramehart instrument co., Succasunna, N.J. Contact angle can be used as a measure of wettability, which is the ability of a liquid to maintain contact with a solid surface due to intermolecular interactions among the liquid and solid. The intermolecular interactions are determined by, e.g., adhesive and cohesive forces among the solid and liquid. In terms of contact angle, a liquid having a larger contact angle as compared to another liquid is considered to have a relatively larger degree of wettability with respect to the solid. Also, the contact angle of a liquid can be used to determine surface energy and interfacial tension by well known methods such as those that use the height of liquid in a column of a capillary tube. The interfacial tension "γ" and contact angle "θ" can be influenced by factors such as the viscosity of the disc lubricant and/or any surface coating(s) of the fluid pathway.

Fluid pathways incorporated into a slider body, as described herein can have a variety of geometric cross-sections and hence a variety of effective radius of curvatures. Exemplary geometric cross-sections include a circular cross-section, a semi-circular cross-section, a square-like cross-section, a rectangular-like cross-section, and the like. The effective radius of curvature of a circle or circular-type (e.g., semi-circle) cross-section of a pathway is equal to its radius of curvature. For pathways having a non-circular type cross-section, the effective radius of curvature can be determined by well known methods of calculation. For example, for a non-circular type cross-section such as a rectangle or rectangular-like cross-section, the effective radius of curvature can be determined by the following equation, where the pathway is an open channel that is in fluid communication with a surface of a slider:

$$r=(a*b)/(2a+b) \quad \text{(Equation 1.a)},$$

where "a" is depth of the channel and "b" is the width of the channel.

If the channel is within a slider yet in fluid communication with a surface of a slider, then the effective radius of curvature can be determined by the following equation:

$$r=(a*b)/(2a+2b) \quad \text{(Equation 1.b)},$$

where "a" is depth of the channel and "b" is the width of the channel.

The effective radius of curvature "r" that is selected for a fluid pathway such as a channel can depend on the interfacial tension "γ" and contact angle "θ" described above with respect to Equation 1. For example, if it is desired to increase the capillary pressure and interfacial tension "γ" cannot be increased for a particular reason then the effective radius of curvature "r" could be reduced so as to increase the capillary pressure, and vice versa. Also, the effective radius of curvature "r" that is selected for a fluid pathway may depend on the roughness of the fluid pathway. In general, it may be desirable to have the effective radius of curvature be at least an order of magnitude greater than the surface roughness of the pathway. For example, if the surface roughness of the pathway is 0.1 micrometer then the effective radius of curvature may be at least 1.0 micrometer. The roughness of the fluid pathway may be influenced by one or more processes used to make the slider and/or fluid pathway such as ion-milling, etching, combinations of these, and the like.

In one embodiment, a fluid pathway has an effective radius of curvature of 1.0 micrometer or more. In another embodiment, a fluid pathway has an effective radius of curvature in the range of 0.5 to 10 micrometers. In yet another embodiment, a fluid pathway has an effective radius of curvature of 1.0 micrometer or less (e.g. from 0.1 micrometer to 1.0 micrometer).

Also, a fluid pathway for transporting fluid such as lubricant via capillary action can be located in one or more areas on or in a slider body. In some embodiments, such a fluid pathway can be located on the trailing edge face of the slider body. In yet other embodiments, such a fluid pathway can be located on the air bearing face of the slider body. As used herein, the phrase "air bearing face" refers to any portion of the surface of the slider that faces the disc during operation.

Figures 5, 6:
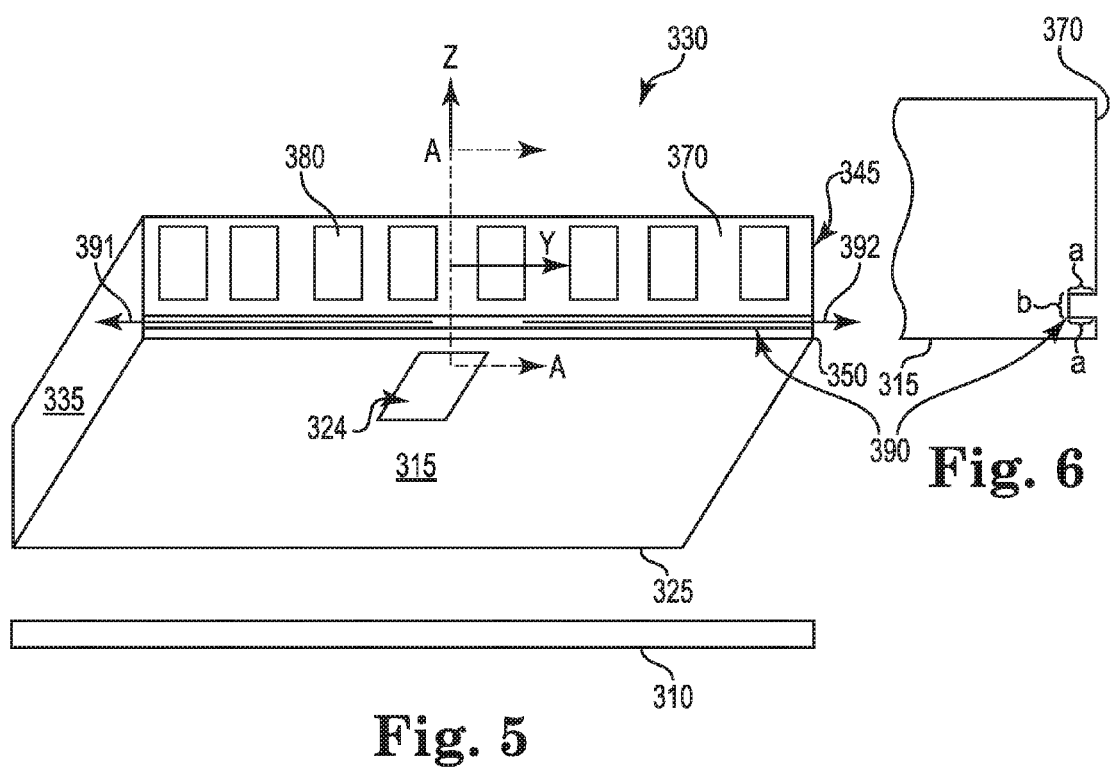
FIG. 5 is a perspective schematic view of an embodiment of a slider body according to the present invention.
FIG. 6 shows view A-A identified in FIG. 5.

An example of a fluid pathway for transporting liquid via capillary action is illustrated in FIG. 5. As shown in FIG. 5, slider body 330 is positioned above disc 310. Slider body 330 includes an air bearing face 315 having a leading edge 325 and a trailing edge 350. Slider body 330 also includes a first side face 335, a second side face 345, and trailing edge face 370 having bond pads 380. As discussed above, lubricant (not shown) is typically provided on disc 310 but can transfer to air bearing face 315, especially during read/write operations, and migrate toward trailing edge 350. To help reduce or prevent lubricant from accumulating near trailing edge 350 (and eventually dripping directly below onto disc 310, slider body 330 includes a channel 390 in fluid communication with trailing edge face 370. Channel 390 is configured to cause lubricant and/or organic contaminant that may be present (e.g., accumulate) near trailing edge 350 to propel and stretch along channel 390 via a capillary effect. In some embodiments where lubricant and/or organic contaminant accumulates near transducer region 324, channel 390 can transport the lubricant and/or organic contaminant away from a transducer region 324 and toward first side face 335 and second side face 345 via capillary action as indicated by arrows 391 and 392, respectively.

In more detail, FIG. 6 shows view A-A, which illustrates channel 390 in cross-section. As shown, channel 390 has three sides that define an open trough-like profile that is in fluid communication with trailing edge face 370 so that channel 390 can receive lubricant as it migrates toward trailing edge 350. As can be seen in the cross-sectional view of FIG. 6, each pair of intersecting sides of channel 390 intersect at 90 degrees (i.e., are perpendicular to each other), but the intersecting sides of channel 390 could be at one or more different angles such as acute angles or obtuse angles.

Figure 9:
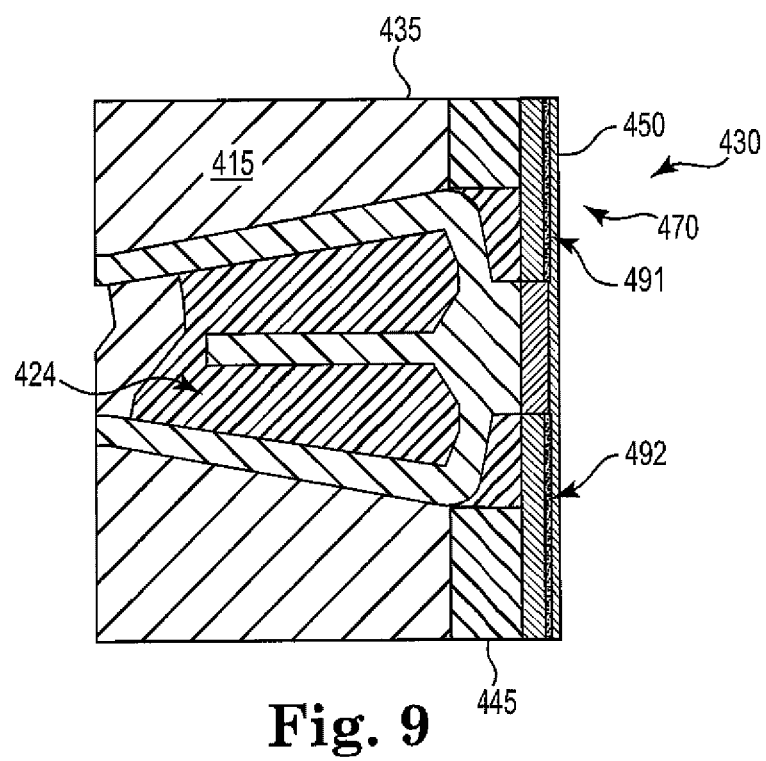
FIG. 9 shows a bottom view of another embodiment of a slider body according to the present invention.

Another example of a fluid pathway for transporting liquid via capillary action is illustrated in FIG. 9. As shown in FIG. 9, slider body 430 is shown from the bottom and includes an air bearing face 415 having a trailing edge 450. Slider body 430 also includes a first side face 435, a second side face 445, and trailing edge face 470. As discussed above, lubricant (not shown) is typically provided on a disc but can transfer to air bearing face 415, especially during read/write operations, and migrate toward trailing edge 450. To help reduce or prevent lubricant from accumulating near trailing edge 450 (and eventually dripping directly below onto the disc, slider body 430 includes two channels 491 and 492, each in fluid communication with trailing edge face 470. Channels 491 and 492 are configured to cause lubricant and/or organic contaminant that may be present (e.g., accumulate) near trailing edge 450 to propel and stretch along channels 491 and 492, respectively, via a capillary effect. In some embodiments where lubricant and/or organic contaminant accumulates near transducer region 424, channels 491 and 492 can transport the lubricant and/or organic contaminant away from a transducer region 424 and toward first side face 435 and second side face 445, respectively, via capillary action.

In some embodiments, a fluid pathway for transporting lubricant via capillary action can extend at least partially across the width of a slider body where the width of the slider body is defined as the distance from one side face of the slider body to the other side face of the slider body. As shown in FIG. 5, channel 390 extends from first side face 335 to second side face 345 (i.e., across the width of the slider body 330) and has a uniform cross-section from first side face 335 to second side face 345. As shown in FIG. 9, each of the channels 491 and 492 is less than the width of slider body 430 and each of the channels 491 and 492 are located between transducer region 424 and trailing edge 450. A pair of disjointed channels 491 and 492 on either side of the transducer region 424 can be selected because features having the size and shape of channels 491 and 492 can influence the pressure distribution over the transducer region 424 and hence the air-bearing fly characteristics and stiffness of slider body 430 if channels 491 and 492 are too near transducer 424. However, locating disjointed channels 491 and 492 on either side of transducer region 424 as shown in FIG. 9 can eschew such effects.

Alternatively, a liquid pathway such as channel 390 can be configured to have capillary pressure gradient due to the geometry of the pathway so as to enhance the drive of liquid towards one or more sides of the slider body and away from the transducer region. Referring to Equation 1 above, it can be seen that reducing the effective radius "r" can increase the capillary pressure ($P_{capillary}$) and hence drive a fluid due to capillary action more effectively. Therefore, in some embodiments, a capillary pressure gradient can be provided by reducing the effective radius of curvature toward one or more sides of the slider. For instance, reducing the effective radius toward the sides of a slider along the positive and negative y-axes (i.e., across the width of a slider) can be described using Equation 2 as follows:

$$r = r_0 - a_1 |y| \quad \text{(Equation 2)},$$

where $a_1$ is a constant that determines a linear rate of change of the radius of curvature and $a_1 > 0$; $r_0$ is the radius of curvature at the center of the of the fluid pathway along the width of the slider; and y is the coordinate along the width of the slider.

Equation 2 yields a positive capillary pressure gradient, which can help propel fluid such as lubricant toward the side-edges of a slider and away from the transducer region. In embodiments where the reduction in channel cross-section is relatively small the capillary pressure as a function of coordinate along the y-axis of a slider is given by. Equation 3 as follows:

$$P_{capillary}(y) = \frac{2\gamma \cos\emptyset (1 + a_1|y|)}{r_0},\quad \text{(Equation 3)}$$

where $a_1$ is a constant that determines a linear rate of change of the radius of curvature and $a_1 > 0$; $r_0$ is the radius of curvature at the center of the of the fluid pathway along the width of the slider; and y is the coordinate along the width of the slider. The corresponding capillary pressure gradient along the y-axis going in the direction away from transducer region towards the side faces of the slider is then given by Equation 4 as follows:

$$dP_{capillary}/dy \sim (2 * a_1 * \gamma * \cos \theta)/r_0 \quad \text{(Equation 4)}.$$

The effective radius of curvature of a fluid pathway such as a channel can be reduced gradually and/or continuously toward the sides of slider. In some embodiments, a decrease in cross-section of a channel toward the sides (e.g., sides 335 and 345 in FIG. 5) of a slider can be implemented as one or more step changes to the width and/or depth of the channel going from the transducer region toward the edges of the slider. In one embodiment, at least one channel has at least a first effective radius of curvature and a second effective radius of curvature where the second radius of curvature is less than the first radius of curvature so that the channel can propel a fluid toward the at least one side face of a slider via capillary action. In other embodiments, additional reductions in effective radius of curvature can be provided. Also, when a fluid pathway such as a channel is provided on an air bearing face (e.g., as shown in FIG. 9) near a transducer region a reduction in channel cross-section toward the side edges of a slider can help create a pressure gradient toward the side edges of the slider in addition to a favorable capillary pressure gradient, thereby augmenting the capillary-driven flow of fluid such as lubricant away from the transducer region.

Optionally, a fluid pathway such as channel 390 in FIG. 5 or channels 491 and 492 in FIG. 9 can be modified to have a capillary pressure gradient (or enhanced capillary pressure gradient) due to the surface energy of the pathway so as to help propel fluid such as lubricant toward one or more sides of the slider body and away from the transducer region. Referring to Equation 1 above, it can be seen that increasing the interfacial tension ($\gamma$) (or surface energy) of a fluid pathway can increase the capillary pressure ($P_{capillary}$) and hence drive a fluid due to capillary action more effectively. Therefore, a capillary pressure gradient can be provided or enhanced by increasing the surface energy of one or more fluid pathways toward one or more sides of the slider.

Surface energy gradients can be provided in a variety of ways. In some embodiments, one or more surface coatings can be provided to a fluid pathway in a manner to increase the surface energy toward the sides of a slider. For example, at least one channel can have at least a first coating having a first surface energy and a second coating having a second surface energy where the second surface energy is greater than the first surface energy so that the channel can transport a fluid such as a lubricant toward at least one side face of a slider body via capillary action.

Figure 7:
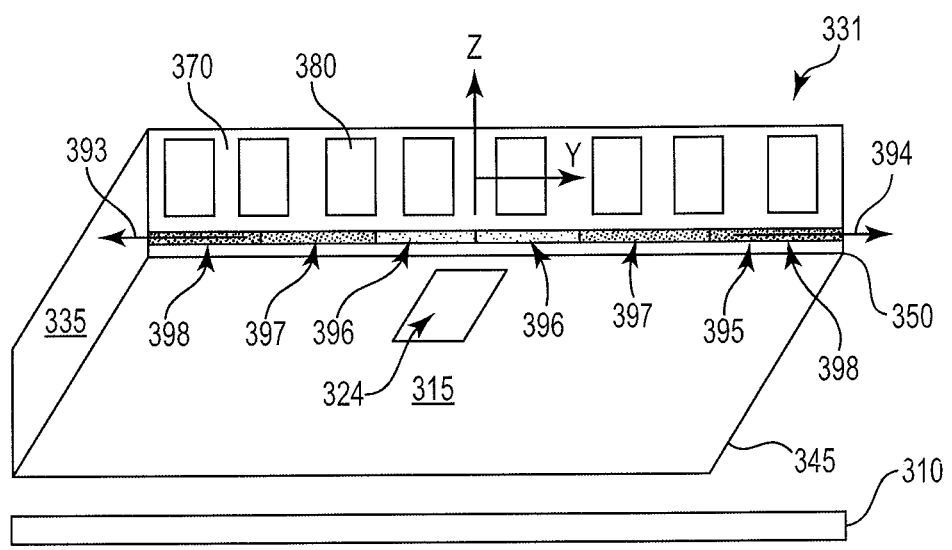
FIG. 7 shows a perspective schematic view of an optional embodiment of the slider body shown in FIG. 5.

An example of a fluid pathway that has a surface energy gradient to help propel fluid such as lubricant via capillary action is illustrated in FIG. 7. The embodiment shown in FIG. 7 is similar to the slider body shown in FIG. 5, except that the channel for propelling lubricant away from the transducer region has been modified to have a surface energy gradient. As shown in FIG. 7, slider body 331 is positioned above disc 310. Slider body 331 includes an air bearing face 315 having a trailing edge 350. Slider body 331 also includes a first side face 335, a second side face 345, and trailing edge face 370 having bond pads 380. As discussed above, lubricant (not shown) is typically provided on disc 310 but can transfer to air bearing face 315, especially during read/write operations, and migrate toward trailing edge 350. To help reduce or prevent lubricant from accumulating near trailing edge 350 (and eventually dripping directly below onto disc 310, slider body 330 includes a channel 395 in fluid communication with trailing edge face 370. Channel 395 is modified to cause lubricant and/or organic contaminant that may be present (e.g., accumulate) near trailing edge 350 to propel and stretch along channel 395 via a capillary effect. In some embodiments where lubricant and/or organic contaminant accumulates near transducer region 324, channel 395 can propel the lubricant and/or organic contaminant away from a transducer region 324 and toward first side face 335 and second side face 345 via capillary action as indicated by arrows 393 and 394, respectively. In detail, channel 395 is provided with three different surface coatings on each side of the z-axis so as to provide a surface energy gradient along the length of channel 395. The surface energy of the coatings increases toward side faces 335 and 345. As shown along the negative y-axis in FIG. 7, a first coating having a first surface energy is indicated by region 396, a second coating having a second surface energy is indicated by region 397, and a third coating having a third surface energy is indicated by region 398. The third surface energy is greater than the second surface energy and the second surface energy is greater than the first surface energy. The surface energy gradient provided by regions 396, 397, and 398 can be applied to channel 395 along the positive y-axis well in a mirror-like fashion so that the surface energy of the coatings increases toward side face 345. By coating channel 395 as shown in FIG. 7, the resulting surface energy gradient can provide additional shear (Marangoni) forces at the walls of channel 395 so as to help drive the flow of fluid such as lubricant away from the transducer region 324 and toward the side faces 335 and 345.

Channel 395 can be coated using well known deposition techniques in slider technology such as chemical vapor deposition, physical vapor deposition, and the like. Coating materials for use in a fluid pathway as described herein include a wide variety of well-known materials including one or more of oleophobic materials and hydrophobic materials (such as Teflon®, fluorine-containing polymers containing Fluorolink® D10H from Solvay, and spin-coated ceramic powders with Flurolink® D10H), and doped Diamond-like Carbon (doped DLC). Referring to FIG. 7, an example of different coatings in regions 396, 397, and 398 includes fluorinated-DLC as the coating in region 396, pure DLC (a-C:H) as the coating in region 397, and nitrogenated-DLC as the coating in region 398. Such a coating scheme can produce a surface energy gradient along the trailing edge 350 that drives the lubricant away from the transducer region 324 and toward the side faces 335 and 345. In another embodiment, the coating in region 396 may include an oleophobic material or a hydrophobic material while the coating in region 397 includes pure DLC (a-C:H) and the coating in region 398 includes nitrogenated-DLC. Including an oleophobic material or a hydrophobic material for the coating in region 396 may advantageously help break up the lubricant or contaminant droplet into much smaller droplets that may then have reduced inertia and friction drag to motion under the influence of the surface energy gradient provided by the coating scheme in FIG. 7.

A fluid pathway as described herein can be oriented with respect to the slider body in any manner to help remove fluid such as lubricant from the transducer region of a slider and prevent fluid buildup. In some embodiments, a fluid pathway can include at least one channel that is substantially parallel to the trailing edge. As used herein, "substantially" parallel means that the channel is oriented generally parallel to the trailing edge of a slider so as to most efficiently propel lubricant toward the side faces of the slider. For example, channel 390 in FIG. 5 is substantially parallel to trailing edge 350 of slider body 330. As another example, channels 491 and 492 in FIG. 9 are each substantially parallel to trailing edge 450 of slider body 430.

In some embodiments, a fluid pathway as described herein can also be configured so that the pathway is in fluid communication with one or more side faces of a slider body to dispense fluid such as lubricant at the one or more side faces as the lubricant is propelled away from the transducer region and toward the side faces. For example, channel 390 in FIG. 5 is in fluid communication with each of side faces 335 and 345 such that lubricant can drip from the first side face 335 and/or second side face 345 as the lubricant reaches the first side face 335 and second side face 345. In this way, the lubricant can be distributed as preferably relatively small drops, which can drip onto the disc 310 below from the first side face 335 and/or second side face 345. Managing the lubricant in this way with channel 390 can help reduce or prevent the risk of read-write errors due to slider interaction with droplets of lubrication that have fallen from the slider onto the disc below the transducer region 324. For example, after the lubricant has been transferred to the first side face 335 and/or the second side face 345 via channel 390, the lubricant can drip off from the first side face 335 and/or the second side face 345 onto disc 310 instead of from a location near transducer region 324. As the lubricant drips onto disc 310 from the first side face 335 or the second side face 345, it tends to drip outside of the track that the transducer region 324 is lined up with for read/write operations and, therefore, tends to reduce or prevent the risk of causing read-write errors as the transducer region 324 flies over disc 310 due to slider interaction with droplets of lubrication that have fallen from the slider onto the disc below the transducer region 324.

Optionally, to help dispense fluid such as lubricant from the side face of a slider as just described, the surface energy of at least a portion of a side face can be selected to be relatively less than the surface energy of a portion of a fluid pathway that is proximal to the side face. Coating at least the portion of a side face of a slider around the region of, e.g., a channel exit point with a relatively lower surface-energy material can help break up the flow of lubricant exiting the channel into small droplets that can passively drop-off on to a disc below in a benign manner and away from the transducer region. In some embodiments, at least one channel of a slider body is in fluid communication with the at least one side face and the channel has a surface that has a first surface energy and is proximate the at least one side face. The at least one side face has a surface that has a second surface energy that is less than the first surface energy and is proximate the at least one channel. Such coatings can be applied using well known deposition techniques in slider technology such as chemical vapor deposition, physical vapor deposition, and the like. Coating materials for use in a fluid pathway as described herein include a wide variety of well known and commercially available materials such as fluorinated diamond-like carbon, Teflon®, high temperature fluorinated polymers, and the like.

Figure 8:
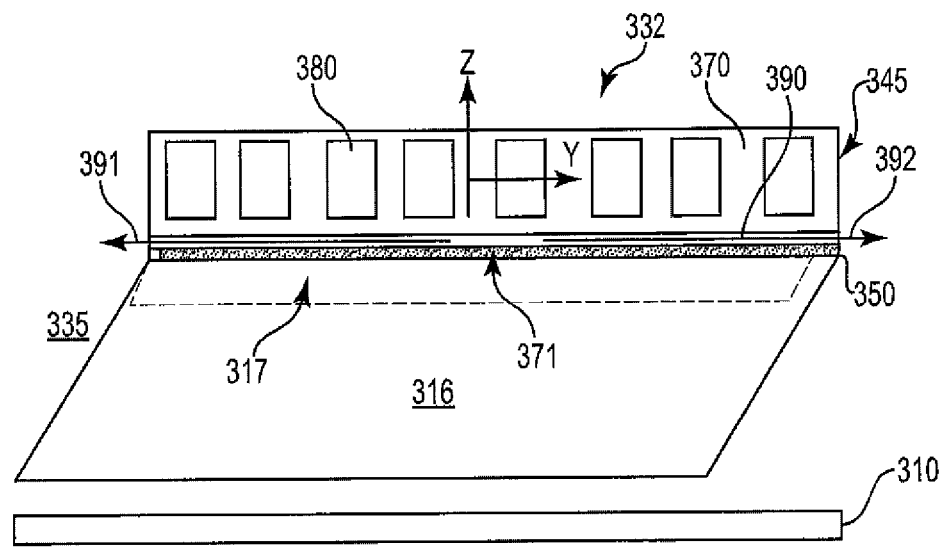
FIG. 8 shows a perspective schematic view of another optional embodiment of the slider body shown in FIG. 5.

Optionally, a surface energy gradient can be provided among the air bearing face and trailing edge face of a slider so as to help propel fluid such as lubricant from one face to another and toward a fluid pathway as described herein that is configured to transport the fluid via capillary action toward a side face of the slider and away from the transducer region. An example of providing a surface energy gradient can be provided among the air bearing face and trailing edge face of a slider is illustrated with respect to FIG. 8. As shown in FIG. 8, slider body 332 includes an air bearing face 316 having a coating in region 317 and a trailing edge face 370 having a coating in region 371. The coating in region 371 has a higher surface energy relative to the surface energy of the coating in region 317 near the transducer (not shown). This difference among surface energies among the coatings in regions 317 and 371 can help a droplet of lubricant migrate from the air bearing face 316 near the trailing edge 350 to the channel 390 located on trailing edge face 370. The channel 390 on the trailing edge face 370 can then transport the lubricant toward the side faces 335 and 345.

Methods of making fluid pathways such as channels on or in a slider body as described herein can be made using techniques well known in the slider art such as ion milling, wet etching, and the like. An example of ion milling a slider is described in U.S. Pat. No. 8,218,266, wherein the entirety of said patent is incorporated herein for all purposes.

A slider that includes one or more fluid pathways as described herein can be advantageously be used in a disc drive in a manner consistent with known sliders because the fluid pathways operate in a passive manner. Notably, a natural temperature gradient can be generated along the trailing edge of a slider during use due to operation of a transducer. In some embodiments, the temperature of the slider decreases monotonically going away from the transducer region along the width of the slider. The temperature gradient can generate a surface energy gradient of the slider along the width of the slider. Such a gradient can occur because surface energy can increase with decreasing with temperature which results in lower surface energy near the transducer region and higher surface energy going away from the transducer region along the width of a slider. Such a temperature-induced surface energy gradient can present shear (Marangoni) forces at a lubricant droplet-channel interface which could enhance the capillary action of a channel as described herein and help propel the droplets of lubricant away from the transducer region towards the side-edges of the slider.

Optionally, a natural temperature gradient along the trailing edge of a slider as just discussed could be augmented by including one or more additional heat sources in the slider (i.e., in addition to the heat generated from a transducer), preferably in close proximity to the trailing edge. An example of augmenting a slider with an additional heating source so as to increase the temperature gradient along the trailing edge with the temperature being higher toward the transducer region includes incorporating a thin-film (deposited), serpentine ohmic-heating circuit in the channel of the slider, where the channel is preferably in close proximity to the trailing edge. A sufficiently large enough DC current can be provided through the circuit so as to produce additional heat in the channel near the trailing edge of the slider. Such a heating circuit could be incorporated into a channel of a slider using well-known metallic deposition coating techniques. An example of depositing metal on a slider is described in U.S. Pat. No. 4,593,334, wherein the entirety of said patent is incorporated herein for all purposes.

What is claimed is:

1. A slider body comprising:
   an air bearing face, wherein the air bearing face comprises a leading edge and a trailing edge;
   a first side face and a second side face;
   a trailing edge face that is adjacent to the trailing edge of the air bearing face; and
   at least one fluid pathway in fluid communication with the air bearing face and/or the trailing edge face; wherein the at least one fluid pathway has an effective radius of curvature and is in fluid communication with at least one side face so that the at least one fluid pathway can transport a fluid to the at least one side face via capillary action.

2. The slider body according to claim 1, wherein the at least one fluid pathway comprises at least one channel.

3. The slider body according to claim 2, wherein the at least one channel is located on the trailing edge face.

4. The slider body according to claim 3, wherein the at least one channel is substantially parallel to the trailing edge.

5. The slider body according to claim 3, wherein the at least one channel extends across the trailing edge face and is in fluid communication with the first side face and the second side face.

6. The slider body according to claim 3, wherein the trailing edge face comprises a first surface coating having a surface energy and the air bearing surface comprises a second surface coating having a surface energy, and wherein the surface energy of the first surface coating is greater than the surface energy of the second surface coating such that liquid that is present on the air bearing face can migrate towards the trailing edge face due to at least the greater surface energy of the first surface coating.

7. The slider body according to claim 2, wherein the at least one channel is located on the air bearing face.

8. The slider body according to claim 7, wherein the at least one channel is substantially parallel to the trailing edge.

9. The slider body according to claim 7, wherein the at least one channel is in fluid communication with at least one side face.

10. The slider body according to claim 7, wherein the at least one channel comprises a first channel and a second channel, and wherein the first channel is in fluid communication with the first side face and the second channel is in fluid communication with the second side face.

11. The slider body according to claim 7, wherein the air bearing face comprises a transducer region, and wherein the at least one channel is located between the transducer region and the trailing edge.

12. The slider body according to claim 2, wherein the effective radius of curvature of the at least one channel is in the range from 1 micrometer 10 micrometers.

13. The slider body according to claim 12, wherein the at least one channel has at least a first effective radius of curvature and a second effective radius of curvature, and wherein the second radius of curvature is less than the first radius of curvature so that the channel can transport a fluid towards the at least one side face via capillary action.

14. The slider body according to claim 2, wherein at least a portion of the channel includes a metallic coating that is in electrical communication with a current source such that the metallic coating can generate heat via the current source.

15. The slider body according to claim 2, wherein the at least one channel has at least a first coating having a first surface energy and a second coating having a second surface energy, and wherein the second surface energy is greater than the first surface energy so that the channel can transport a fluid towards the at least one side face via capillary action.

16. The slider body according to claim 2, wherein the at least one channel is in fluid communication with the at least one side face, wherein the channel has a surface that has a first surface energy and is proximate to the at least one side face, wherein the at least one side face has as surface that has a second surface energy and is proximate to the at least one channel, and wherein the second surface energy is less than the first surface energy.

17. A slider body comprising:
   an air bearing face, wherein the air bearing face comprises a leading edge and a trailing edge;
   a first side face;
   a second side face;
   a trailing edge face that is adjacent to the trailing edge of the air bearing face; and
   at least one channel in fluid communication with the air bearing face and/or the trailing edge face; wherein the at least one channel is in fluid communication with the first side face and the second side face, wherein the at least one channel has an effective radius of curvature to transport a fluid to the first side face and the second side face via capillary action, wherein the fluid comprises a lubricant, wherein the at least one channel has an effective radius of curvature in the range from 0.5 to 10 micrometers.

18. The slider body according to claim 17, wherein the at least one channel is located on the trailing edge face, and wherein the at least one channel extends across the trailing edge face and is in fluid communication with the first side face and the second side face.

19. The slider body according to claim 17, wherein the at least one channel is located on the air bearing face.

\* \* \* \* \*